US012560736B2

(12) United States Patent
Banzarov et al.

(10) Patent No.: US 12,560,736 B2
(45) Date of Patent: Feb. 24, 2026

(54) DETERMINATIONS OF STANDOFF AND MUD DENSITY WITH GAMMA DENSITY AND ACOUSTIC TOOL RESPONSES

(71) Applicant: Baker Hughes Oilfield Operations LLC, Houston, TX (US)

(72) Inventors: Bair Banzarov, Celle (DE); Alexander Vinokurov, Novosibirsk (RU); Andreas Vogt, Celle (DE); Andre Haeussler, Celle (DE); Ilgizar Nasibullin, Bulgakovo (RU); Ilya Blinov, Tyumen (RU)

(73) Assignee: Baker Hughes Oilfield Operations LLC, Houston, TX (US)

( * ) Notice: Subject to any disclaimer, the term of this patent is extended or adjusted under 35 U.S.C. 154(b) by 213 days.

(21) Appl. No.: 18/277,866

(22) PCT Filed: Jun. 22, 2023

(86) PCT No.: PCT/US2023/025968
§ 371 (c)(1),
(2) Date: Aug. 18, 2023

(87) PCT Pub. No.: WO2023/250080
PCT Pub. Date: Dec. 28, 2023

(65) Prior Publication Data
US 2025/0004161 A1 Jan. 2, 2025

(30) Foreign Application Priority Data
Jun. 23, 2022 (EA) ................................. 202291622

(51) Int. Cl.
*G01V 5/12* (2006.01)
*E21B 47/107* (2012.01)
(Continued)

(52) U.S. Cl.
CPC ............ *G01V 5/125* (2013.01); *E21B 47/107* (2020.05); *E21B 47/11* (2020.05); *G01V 11/00* (2013.01)

(58) Field of Classification Search
CPC ....... E21B 47/11; E21B 47/107; G01V 5/125; G01V 1/00
See application file for complete search history.

(56) References Cited

U.S. PATENT DOCUMENTS 4,829,176 A * 5/1989 Paske ........................ G01V 5/12
250/254
5,130,950 A * 7/1992 Orban .................... G01B 17/00
73/152.58
(Continued)

FOREIGN PATENT DOCUMENTS

GB 2320567 6/1998
RU 1605630 11/1995
(Continued)

OTHER PUBLICATIONS

International Search Report and Written Opinion issued Sep. 6, 2023 in PCT Application No. PCT/US2023/025968.
(Continued)

*Primary Examiner* — Blake C Riddick
(74) *Attorney, Agent, or Firm* — Hogan Lovells US LLP

(57) ABSTRACT

A method for determining at least one of a mud density or a standoff, includes determining, a short-spaced density, a long-spaced density, and a time of sound propagation between a tool body and a borehole wall. The method also includes determining, based at least in part on the short-spaced density and the long-spaced density, a formation density using a spine-and-rib-diagram. The method further includes determining a distance-to-spine value based on the short-spaced density, the long-spaced density, and the formation density. The method includes determining a mud
(Continued)

density approximation, based at least on the distance-to-spine value. The method also includes determining a standoff approximation, based at least on the mud density approximation. The method further includes determining, based at least on the mud density approximation and the standoff approximation, at least one of a computed mud density or a computed standoff.

20 Claims, 8 Drawing Sheets

(51) Int. Cl.
    *E21B 47/11*         (2012.01)
    *G01V 11/00*       (2006.01)

(56)              References Cited

U.S. PATENT DOCUMENTS

| | | | | |
|---|---|---|---|---|
| 5,214,251 | A * | 5/1993 | Orban | E21B 47/107 |
| | | | | 367/27 |
| 5,473,158 | A * | 12/1995 | Holenka | E21B 47/024 |
| | | | | 250/269.4 |
| 5,513,528 | A | 5/1996 | Holenka | |
| 5,841,135 | A | 11/1998 | Stoller | |
| 5,912,460 | A * | 6/1999 | Stoller | G01V 5/125 |
| | | | | 250/269.3 |
| 6,044,326 | A * | 3/2000 | Huiszoon | E21B 47/085 |
| | | | | 702/6 |
| 6,307,199 | B1 * | 10/2001 | Edwards | E21B 47/08 |
| | | | | 250/262 |
| 6,618,322 | B1 | 9/2003 | Georgi | |
| 6,700,115 | B2 * | 3/2004 | Mickael | G01V 5/125 |
| | | | | 250/269.3 |
| 7,544,929 | B1 | 6/2009 | Mickael | |
| 7,809,508 | B2 * | 10/2010 | Desport | G01V 5/125 |
| | | | | 702/9 |
| 10,509,140 | B2 | 12/2019 | Cooper | |
| 2002/0008197 | A1 * | 1/2002 | Mickael | G01V 5/125 |
| | | | | 250/269.2 |
| 2003/0057366 | A1 * | 3/2003 | Gzara | E21B 47/00 |
| | | | | 250/269.3 |
| 2003/0101806 | A1 | 6/2003 | Kurkoski | |
| 2004/0021066 | A1 | 2/2004 | Schneider | |
| 2004/0095847 | A1 * | 5/2004 | Hassan | E21B 47/107 |
| | | | | 367/25 |
| 2007/0040110 | A1 | 2/2007 | Ellis | |
| 2008/0083872 | A1 * | 4/2008 | Huiszoon | G01V 5/125 |
| | | | | 250/269.3 |
| 2009/0043509 | A1 * | 2/2009 | Madigan | E21B 47/085 |
| | | | | 702/11 |
| 2011/0307179 | A1 * | 12/2011 | Zhou | G01V 5/125 |
| | | | | 250/269.1 |
| 2012/0166087 | A1 | 6/2012 | Evans | |
| 2012/0170405 | A1 * | 7/2012 | Zharnikov | G01V 1/50 |
| | | | | 367/27 |
| 2013/0110404 | A1 * | 5/2013 | Moake | G01N 33/24 |
| | | | | 702/8 |
| 2013/0215715 | A1 * | 8/2013 | Hollstein | E21B 49/00 |
| | | | | 367/35 |
| 2013/0261974 | A1 | 10/2013 | Stewart et al. | |
| 2014/0374582 | A1 | 12/2014 | Guo et al. | |
| 2015/0129753 | A1 * | 5/2015 | Inanc | G01V 1/50 |
| | | | | 702/11 |
| 2015/0361742 | A1 * | 12/2015 | Gottlieb | E21B 47/001 |
| | | | | 175/48 |
| 2018/0188410 | A1 * | 7/2018 | Teague | G01V 5/08 |

FOREIGN PATENT DOCUMENTS

| | | |
|---|---|---|
| WO | 2009/006332 | 1/2009 |
| WO | 2020/205711 | 10/2020 |

OTHER PUBLICATIONS

Mathilde Luycx et al., "Fast modeling of gamma-gamma density measurements via gamma-ray point-kernel approximations," Mar. 8, 2019, Geophysics, vol. 84, Issue 2, D57-D72.

Mathilde Luycx et al., "Resolution and accuracy of neutron-gamma density measurements compared to conventional gamma-gamma density measurements," Oct. 9, 2017, SPE Annual Technical Conference and Exhibition, San Antonio, Texas, USA.

Office Action mailed Dec. 7, 2022 in corresponding Eurasian Patent Application No. EA 202291622 (and English translation).

\* cited by examiner

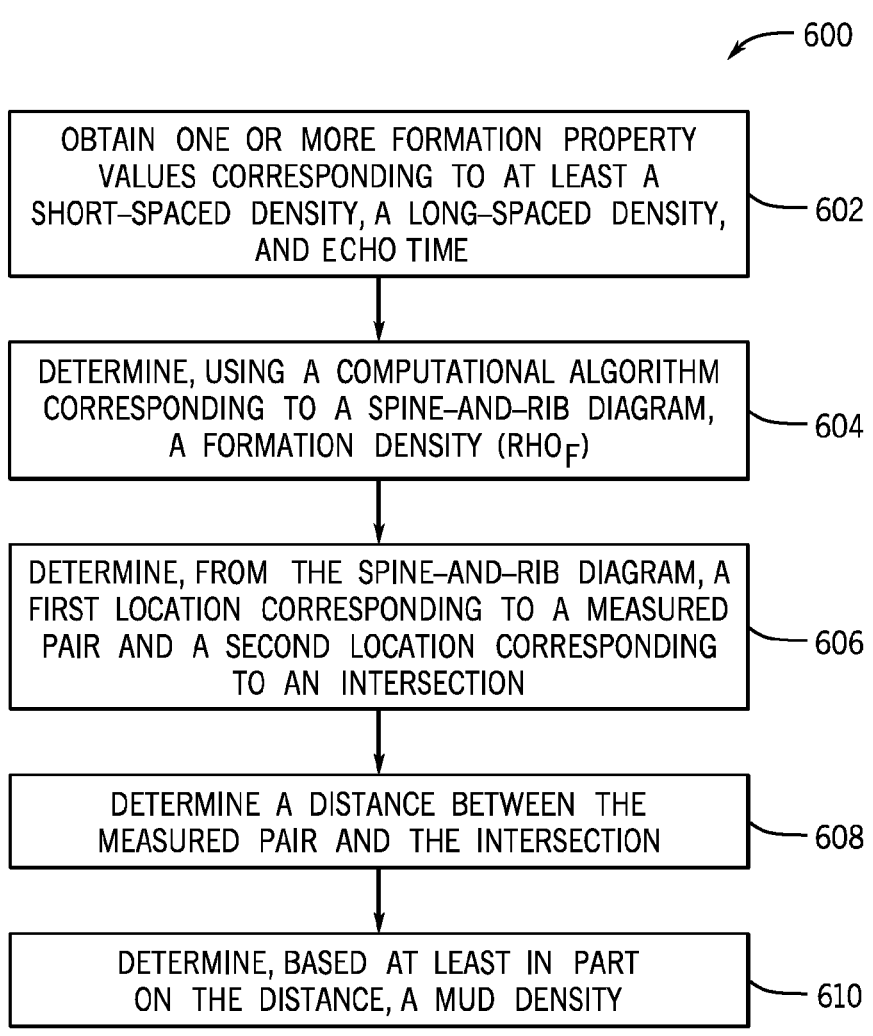

~ 600

OBTAIN ONE OR MORE FORMATION PROPERTY VALUES CORRESPONDING TO AT LEAST A SHORT-SPACED DENSITY, A LONG-SPACED DENSITY, AND ECHO TIME ~ 602

DETERMINE, USING A COMPUTATIONAL ALGORITHM CORRESPONDING TO A SPINE-AND-RIB DIAGRAM, A FORMATION DENSITY (RHO$_F$) ~ 604

DETERMINE, FROM THE SPINE-AND-RIB DIAGRAM, A FIRST LOCATION CORRESPONDING TO A MEASURED PAIR AND A SECOND LOCATION CORRESPONDING TO AN INTERSECTION ~ 606

DETERMINE A DISTANCE BETWEEN THE MEASURED PAIR AND THE INTERSECTION ~ 608

DETERMINE, BASED AT LEAST IN PART ON THE DISTANCE, A MUD DENSITY ~ 610

FIG. 6

DETERMINATIONS OF STANDOFF AND MUD DENSITY WITH GAMMA DENSITY AND ACOUSTIC TOOL RESPONSES

CROSS-REFERENCE TO RELATED APPLICATIONS

This application is a National Stage application of PCT Application No. PCT/US23/25968 filed Jun. 22, 2023 titled "DETERMINATIONS OF STANDOFF AND MUD DEN-SITY WITH GAMMA DENSITY AND ACOUSTIC TOOL RESPONSES," which claims priority to and the benefit of Eurasian Patent Application No. 202291622 filed Jun. 23, 2022 titled "DETERMINATIONS OF STANDOFF AND MUD DENSITY WITH GAMMA DENSITY AND ACOUSTIC TOOL RESPONSES," the full disclosures of which are hereby incorporated by reference in their entirety for all intents and purposes.

BACKGROUND

1. Field of the Disclosure

The present disclosure relates to a system and method for drilling fluid evaluation. Specifically, the present disclosure relates to determinations of standoff and density measure-ments using gamma density tool responses and acoustic caliper measurements.

2. Description of Related Art

Oil and gas production may involve various downhole operations that rely on drilling fluid (e.g., mud, drilling mud) to carry cuttings away from a drill bit, to provide pressure regulation within a wellbore, and the like. Additionally, during drilling operations, mud may also be driven into portions of a downhole formation due to the pressures of the downhole system. Determinations of mud weight may be useful in a variety of applications, such as during drilling operations to influence steering decisions. It may be difficult to determine mud weight accurately because of the various changes that the drilling fluid undergoes when in use. As a result, surface measurements may not be accurate with respect to the pressures and temperatures of a downhole environment. Additionally, deploying additional sensors for mud weight calculations may be expensive, increase a tool length, and also provide varying levels of accuracy.

SUMMARY

Applicant recognized the limitations with existing sys-tems herein and conceived and developed embodiments of systems and methods, according to the present disclosure, for improved measurement systems, such as those used to determine drilling fluid properties.

In an embodiment, a method for determining at least one of a mud density or a standoff includes determining a short-spaced density, a long-spaced density, and a time of sound propagation between a tool body and a borehole wall. The method also includes determining, based at least in part on the short-spaced density and the long-spaced density, a formation density. The method further includes determining a mud density approximation. The method also includes determining a standoff approximation. The method includes determining, from the mud density approximation and the standoff approximation, at least one of a computed mud density or a computed standoff.

In an embodiment, a system includes a drilling rig, a drill string, a drill bit at a distal end of the drill string, a density module, forming at least a portion of the drill string, an acoustic module, forming at least a portion of the drill string, and a controller associated with the drill string. The con-troller includes one or more memories and one or more processors, the one or more memories storing instructions that, when executed by the one or more processors, cause the controller to determine, based at least in part on density module data and acoustic module data, a formation density. The instructions, when executed by the one or more pro-cessors, further cause the controller to estimate an initial approximation for a mud density. The instructions, when executed by the one or more processors, further cause the controller to compute, based on the initial approximation for the mud density, an initial approximation for a standoff. The instructions, when executed by the one or more processors, further cause the controller to determine, based at least in part on the initial approximation for the mud density, the initial approximation for the standoff, and the formation density, a computed mud density and a computed standoff.

In an embodiment, a method for determining a drilling fluid property based, at least in part, on a formation density includes receiving, from a density module, a first density measurement at a first detector position and a second density measurement from a second detector position. The method also includes receiving, from an acoustic module, a time of sound propagation between the module and borehole wall referred to as "echo time". The method further includes determining, based at least in part on the first density measurement and the second density measurement, the formation density. The method also includes determining an initial approximation for a standoff based, at least in part, on an initial approximation for a mud density. The method includes updating the initial approximation of the standoff to a refined approximation of the standoff based, at least in part, on a refined approximation for the mud density. The method further includes determining, based at least in part on the refined approximation of the standoff, a mud density.

In an embodiment, a method for determining at least one of a mud density or a standoff, includes determining a short-spaced density for a formation, a long-spaced density for the formation, and a time of sound propagation between a tool body and a borehole wall. The method also includes determining, based at least in part on the short-spaced density and the long-spaced density, a formation density. The method further includes determining a mud density approximation. The method includes determining a standoff approximation. The method also includes determining, from the mud density approximation and the standoff approxima-tion, at least one of a computed mud density or a computed standoff.

In an embodiment, a system includes a drilling rig, a drill string, a drill bit at a distal end of the drill string, a density module, forming at least a portion of the drill string, an acoustic module, forming at least a portion of the drill string, and a controller associated with the drill string. The con-troller includes one or more memories and one or more processors, the one or more memories storing instructions that, when executed by the one or more processors, cause the controller to determine, based at least in part on density module data and acoustic module data, a formation density, estimate an initial approximation for a mud density, com-pute, based on the initial approximation for the mud density, an initial approximation for a standoff, and determine, based at least in part on the initial approximation for the mud density, the initial approximation for the standoff, and the formation density, a computed mud density and a computed standoff.

In an embodiment a method for determining a drilling fluid property based, at least in part, on a formation density includes receiving, from a density module, a first density measurement at a first detector position and a second density measurement from a second detector position. The method also includes receiving, from an acoustic module, a time of sound propagation between the module and borehole wall. The method further includes determining, based at least in part on the first density measurement and the second density measurement, the formation density. The method includes determining an initial approximation for a standoff based, at least in part, on an initial approximation for a mud density. The method also includes updating the initial approximation of the standoff to a refined approximation of the standoff based, at least in part, on a refined approximation for the mud density. The method further includes determining, based at least in part on the refined approximation of the standoff, a mud density.

In an embodiment, a method for determining at least one of a mud density or a standoff includes determining, with a downhole tool, a short-spaced density, a long-spaced density in a borehole, and a time of sound propagation between a tool body of the downhole tool and a borehole wall of the borehole. The method also includes determining, based at least in part on the short-spaced density and the long-spaced density, a formation density using a spine-and-rib-diagram. The method further includes determining a distance-to-spine value. The method also includes determining a mud density approximation, based at least on the distance-to-spine value. The method includes determining a standoff approximation, based at least on the mud density approximation. The method further includes determining, based at least on the mud density approximation and the standoff approximation, at least one of a computed mud density or a computed standoff.

In an embodiment, a system includes a drilling rig, a drill string, a drill bit at a distal end of the drill string, a density module, forming at least a portion of the drill string, an acoustic module, forming at least a portion of the drill string; and a controller associated with the drill string. The controller includes one or more memories and one or more processors, the one or more memories storing instructions that, when executed by the one or more processors, cause the controller to: determine, based at least in part on density module data and acoustic module data, a formation density; estimate an initial approximation for a mud density; estimate an initial approximation for a standoff, compute, based on the initial approximation for the standoff and a distance-to-spine value, a mud density approximation; compute, based on the initial approximation for the mud density and the mud density approximation, a standoff approximation; and determine, based at least in part on the mud density approximation and the standoff approximation, a computed mud density.

In an embodiment, a method for determining a drilling fluid property based, at least in part, on a formation density includes receiving, from a density module, a first density measurement at a first detector position along the density module and a second density measurement from a second detector position along the density module. The method also includes receiving, from an acoustic module, a time of sound propagation between the acoustic module and a borehole wall. The method further includes determining, based at least in part on the first density measurement and the second density measurement, the formation density. The method includes determining an initial approximation for a mud density. The method also includes determining an initial approximation for a standoff using the acoustic module. The method further includes determining a mud density approximation based on the initial approximation for the standoff and the formation density. The method also includes determining a standoff approximation based on the mud density approximation, the initial approximation for the standoff, and the initial approximation for the mud density. The method includes determining, based at least in part on the standoff approximation, a mud density.

In an embodiment, a method for determining at least one of a mud density or a standoff, includes determining, with a downhole tool in a borehole, a short-spaced density, a long-spaced density, and a time of sound propagation between a tool body of the downhole tool and a borehole wall of the borehole. The method also includes determining, based at least in part on the short-spaced density and the long-spaced density, a formation density using a spine-and-rib-diagram. The method further includes determining a distance-to-spine value based on the short-spaced density, the long-spaced density, and the formation density. The method includes determining a mud density approximation, based at least on the distance-to-spine value. The method also includes determining a standoff approximation, based at least on the mud density approximation. The method further includes determining, based at least on the mud density approximation and the standoff approximation, at least one of a computed mud density or a computed standoff. The method includes performing a borehole operation based on at least one of the computed mud density and the computed standoff.

In an embodiment, a system includes a drilling rig; a drill string; a drill bit at a distal end of the drill string; a density module, forming at least a portion of the drill string; an acoustic module, forming at least a portion of the drill string; and a controller associated with the drill string, the controller including one or more memories and one or more processors. The one or more memories store instructions that, when executed by the one or more processors, cause the controller to: determine, based at least in part on density module data and acoustic module data, a formation density; determine an initial estimation for a mud density; determine an initial estimation for a standoff, compute, based on the initial estimation for the standoff and a distance-to-spine value, a mud density approximation; compute, based on the initial estimation for the mud density and the mud density approximation, a standoff approximation; and determine, based at least in part on the mud density approximation and the standoff approximation, a computed mud density or a computed standoff.

BRIEF DESCRIPTION OF DRAWINGS

The present technology will be better understood on reading the following detailed description of non-limiting embodiments thereof, and on examining the accompanying drawings, in which:

FIG. 6 is a flow chart of an embodiment of a process for determining mud weight, in accordance with embodiments of the present disclosure.

DETAILED DESCRIPTION

Figure 1:
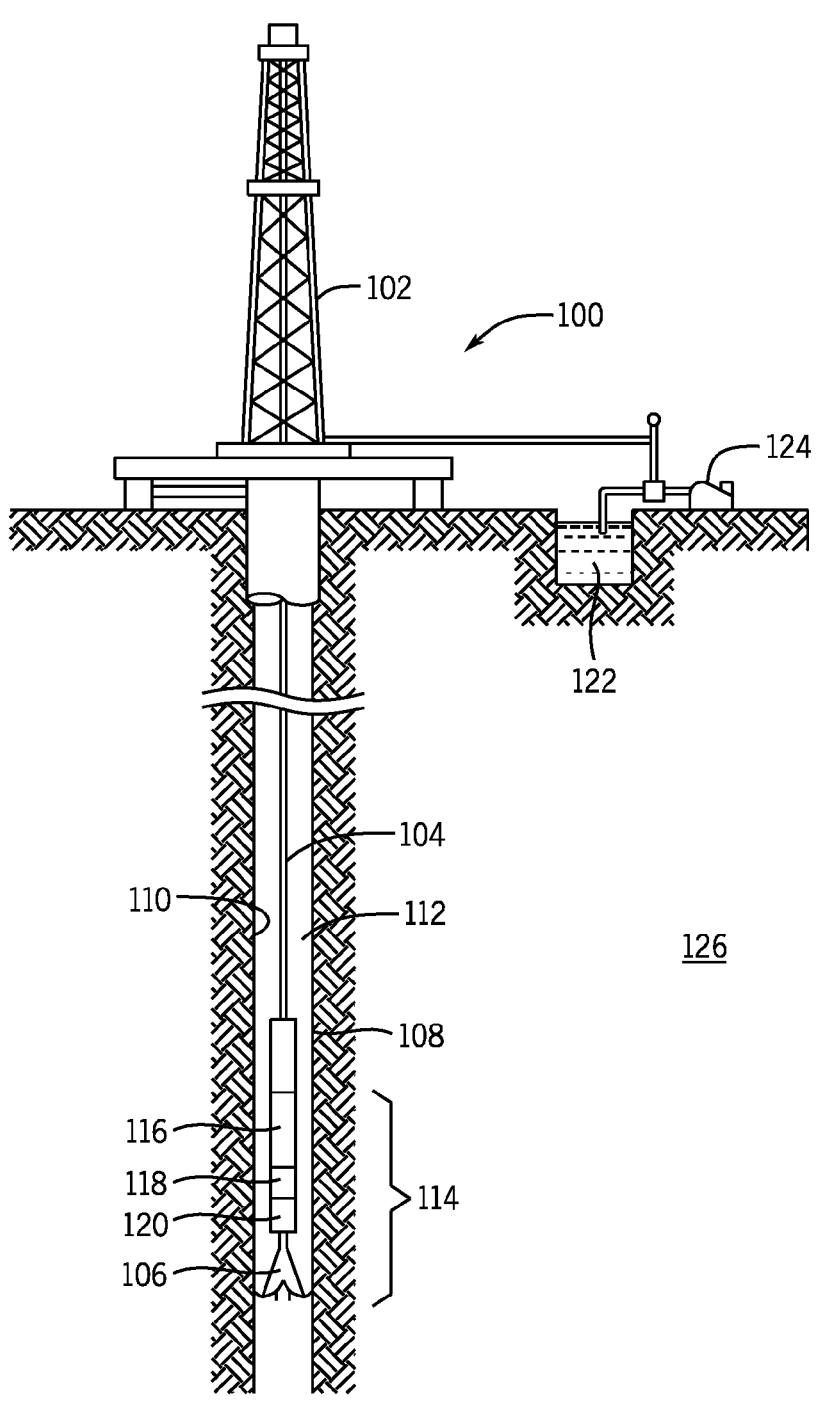
FIG. 1 is a cross-sectional side view of an embodiment of a wellbore system, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose. Additionally, references numerals may be reused for similar features between figures, however, such use is not intended to be limiting and is for convenience and illustrative purposes only.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure are directed toward mud weight determinations using, at least in part, acoustic caliper measurements and gamma density measurements. In other words, mud weight may be calculated through formation density and standoff calculations and then, in various embodiments, may be iteratively computed in order to calculate mud weight at a given location within a wellbore. In at least one embodiment, standoff may be determined using an independent measurement from mud density, and thereafter, one or more mud density algorithms may be applied using the benefit of such a standoff determination, such as, by way of non-limiting example, a spine-and-rib diagram. Various embodiments may determine an initial error in a calculation and then develop systems of equations to iteratively correct the errors until a threshold level of convergence is reached, thereby providing an accurate measurement of mud weight using independently obtained parameters. Furthermore, standoff measurements may also be improved through this iterative process, which provides improved information of the wellbore, which may be applied to a variety of different applications. Various embodiments provide improvements of existing solutions by enabling determinations of mud weight without pressure, temperature, or rheology properties of the mud.

FIG. 1 is a schematic side view of an embodiment of a downhole drilling system 100 (e.g., drilling system) that includes a rig 102 and a drill string 104 coupled to the rig 102. The drill string 104 includes a drill bit 106 at a distal end that may be rotated to engage a formation and form a wellbore 108. As shown, the wellbore 108 includes a borehole sidewall 110 (e.g., sidewall) and an annulus 112 between the wellbore 108 and the drill string 104. Moreover, a bottom hole assembly (BHA) 114 is positioned at the bottom of the wellbore 108. The BHA 114 may include a drill collar 116, stabilizers 118, and the like. For example, various embodiments may include one or more subs that include logging or measurement instrumentation, such as those may be used during a measurement-while-drilling (MWD) operation (e.g., logging-while-drilling (LWD) operation).

In operation, drilling fluid (e.g., drilling mud) is pumped through the drill string 104 and out of the drill bit 106. The drilling mud flows into the annulus 112 and removes cuttings from the face of the drill bit 106. Moreover, the drilling mud may cool the drill bit 106 during drilling operations and further provide pressure stabilization in the wellbore 108. In the illustrated embodiment, the drilling system 100 includes a logging tool 120 that may conduct downhole logging operations to obtain various measurements. There may be multiple such logging tools, where each logging tool may use one or more different measurement modalities. For example, a first logging tool may be a nuclear logging tool, such as a gamma logging tool. A second logging tool may be an acoustic logging tool, such as an acoustic caliper. These different tools may obtain wellbore information that may influence one or more aspects of a drilling operation. Furthermore, various tools may be positioned at different areas of the drill string 104 and the illustrated configuration is provided by way of non-limiting example only.

As noted above, a drilling fluid 122 (e.g., mud) may be pumped down the drill string 104 via a mud pump 124 where it exits the drill bit 106, flows into the annulus 112, and then returns to the surface for collection and reuse, for example, after filtering to remove particulates. Various properties of the mud 122 may be particularly selected for different drilling operations. One such property is mud weight, which may correspond to a mud density (pounds per gallon (ppg) or pound cubic feet) of the drilling fluid. This property may be measured at the surface using a mud scale or a mud balance, among other options. Additionally, properties of the mud 122 may also be evaluated during the drilling operation, for example, when the mud 122 is within the annulus 112. Mud 122 within the annulus may be different from the mud 122 at the surface, due to the temperatures and pressures of a formation 126. These temperatures and pressures may also vary with borehole depth. It may be desirable to determine mud weight 122 during a drilling operation to provide additional information for steering the drill bit 106. However, determining mud weight during drilling operations may be challenging due to tool limitations or expenses associated with specialty equipment, which may increase an operational cost or increase a drill string length, both of which are undesirable to operators. Systems and methods of the present disclosure address these deficiencies by employing different measurement modalities (e.g., gamma density measurements and mud cell or acoustic caliper measurements) in order to determine standoff and mud density. In various embodiments, pressure, temperature, and rheology properties of the mud may not be required to determine the mud weight, thereby providing an improved method to calculate mud weight, and subsequently, to influence operations based on the mud weight.

Figure 2:
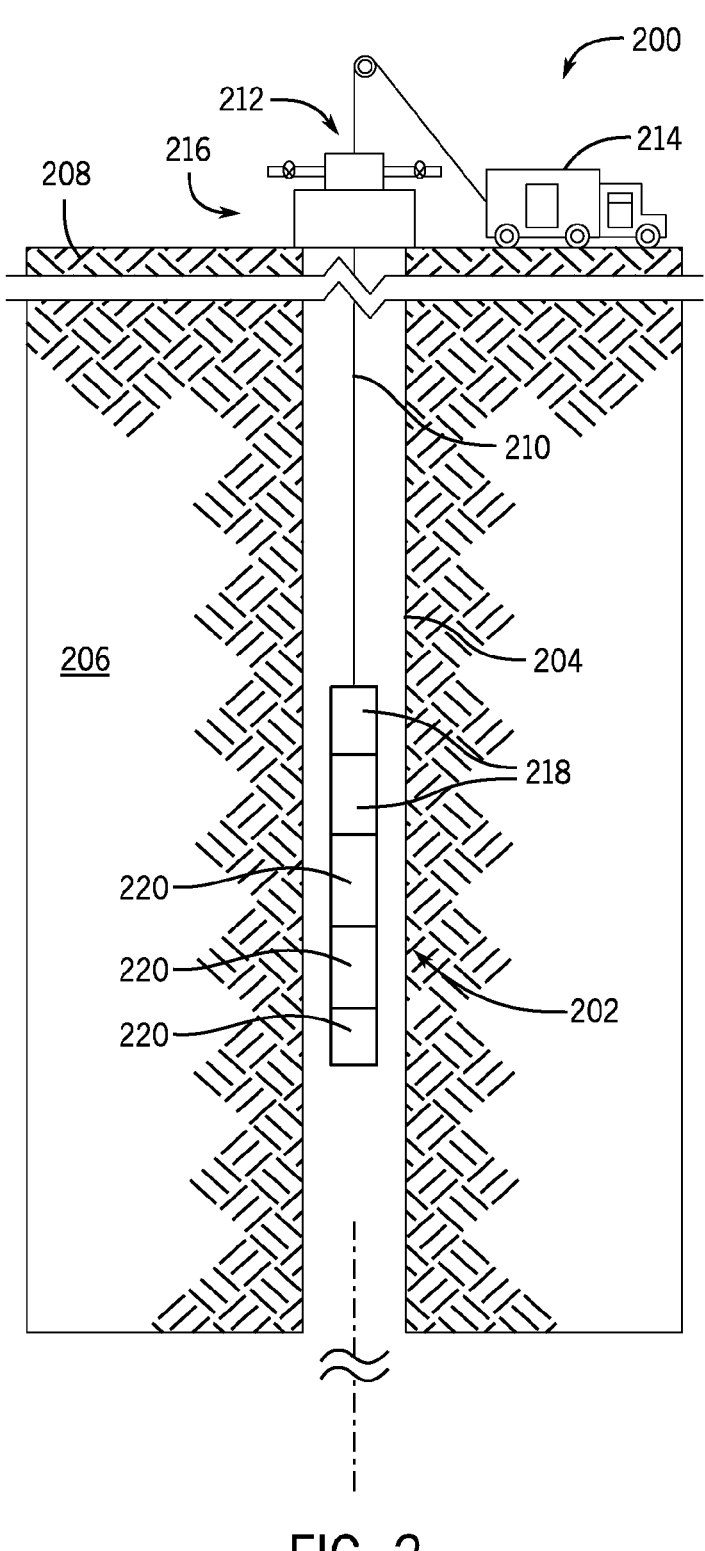
FIG. 2 is a cross-sectional side view of an embodiment of a wellbore system, in accordance with embodiments of the present disclosure.

FIG. 2 is a schematic cross-sectional view of an embodiment of a wellbore system 200 including a downhole tool 202 arranged within a wellbore 204 formed in a formation 206, which may be the same formation 126 from FIG. 1, for example, after the drilling operation is complete. The downhole tool 202 is lowered from a surface location 208 via a conveyance system, such as the illustrated wireline 210, which is shown by way of example only and it should be appreciated that embodiments may be utilized with different conveyance systems. In various embodiments, the electric wireline may transmit electric signals and/or energy from the surface location 208 into the wellbore, for example to provide operational power for the tool 202 and/or to transmit data, such as data obtained from sensors arranged on the tool 202. In various embodiments, the tool 202 may be utilized to perform downhole operations, such as measurement operations, by way of example. It should be appreciated that embodiments exist where the downhole tool 202 is deployed with any other type of conveyance means, including coiled tubing, pipes, cable, and slickline. That is, embodiments of the present disclosure may be utilized in other scenarios.

The wellbore system 200 includes a wellhead assembly 212, shown at an opening of the wellbore 204, to provide pressure control of the wellbore 204 and allow for passage of equipment into the wellbore 204, such as the cable 210 and the tool 202. In this example, the cable 210 is a wireline being spooled from a service truck 214. The wellhead assembly 212 may include a blowout preventer (BOP) 216 (e.g., pressure control device).

In various embodiments, the downhole tool 202 is a logging or measurement tool, such as an acoustic logging tool or a nuclear logging tool, among various other examples. In this example, acoustic logging tools 218 and nuclear logging tools 220, such as gamma logging tools, are shown. It should be appreciated that these tools are shown by way of example and more or fewer tools may be included, as well as other tools with different measurement modalities.

As shown, embodiments of the present disclosure may be utilized in both drilling and logging operations. Furthermore, while not illustrated, various embodiments may also be deployed in other environments, such as subsea environments. Additionally, different conveyance systems may also be utilized, and as a result, the example systems of FIGS. 1 and 2 are provided by way of example only and not intended to limit the scope of the present disclosure.

Various embodiments of the present disclosure are directed toward systems and methods to determine properties of one or more wellbore components, such as mud weight, which may be utilized as data provided to customers, as an input to control a related logging operation, as a data point for further analysis, or various other functions. As a results, embodiments may be utilized in a variety of operations where mud weight may be useful to control operations and/or regulate assets related to borehole stability and safety.

Figure 3:
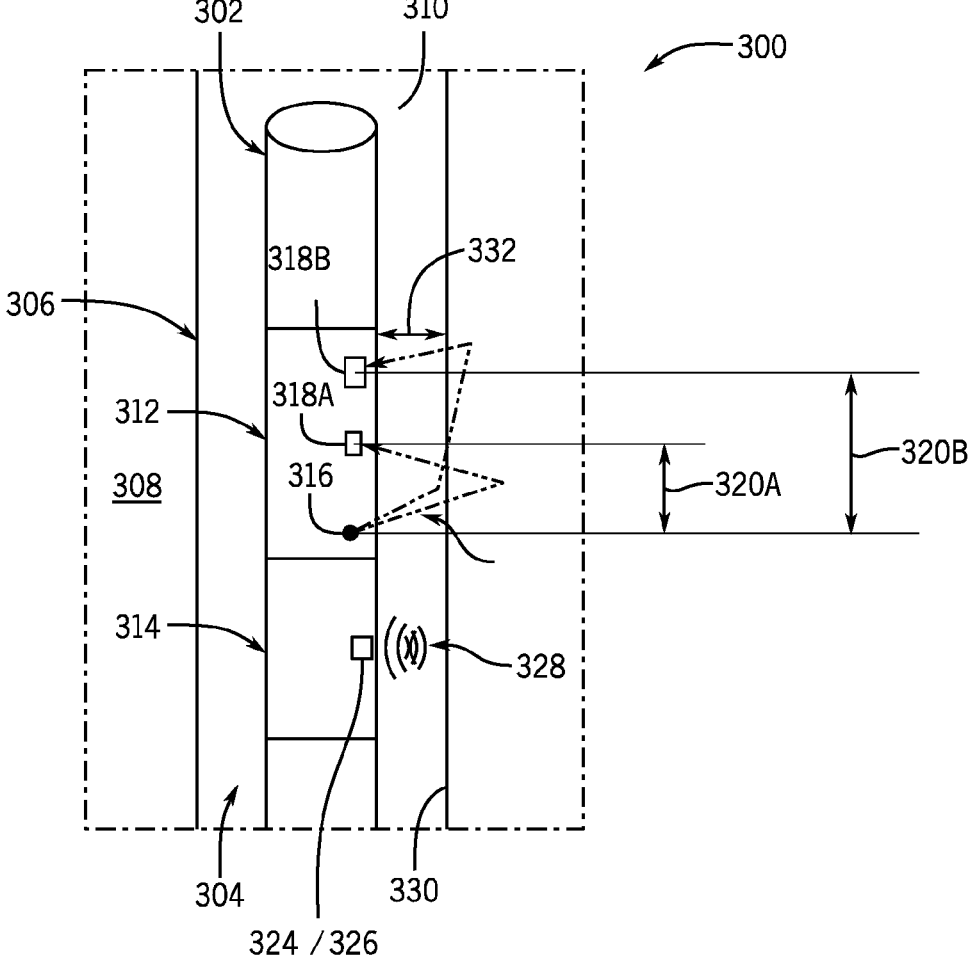
FIG. 3 is a schematic diagram of an embodiment of a formation evaluation operation, in accordance with embodiments of the present disclosure.

FIG. 3 is a schematic diagram of a measurement environment 300 in which a tool segment 302, which may form a portion of the tools 114, 202, is arranged within an annulus 304 (e.g., the annulus 112) of a wellbore 306 (e.g., the wellbores 108, 204) in a formation 308 (e.g., the formations 126, 206). It should be appreciated that the tool segment 302 may be part of a drilling tool, a measurement tool, a wireline tool, or any reasonable tool that may be used in a downhole operation. In this example, the annulus 304 is filled with a drilling fluid 310 (e.g., the mud 122), which may also be referred to as mud. As noted above, drilling fluids such as mud may be mixtures of natural and/or synthetic chemical compounds used to cool and lubricate a drill bit, clean a hole bottom, carry cuttings to a surface, control formation pressures, and/or improve the function of the drill string and tools in the wellbore. Drilling muds may be either water-based or oil-based and may include one or more additives. It should be appreciated that for the purposes of the present disclosure, drilling muds or drilling fluids described herein may be any reasonable type of fluid utilized in wellbore operations.

The tool segment 302 in this example includes a density module 312 and an acoustic module 314. In at least one embodiment, the density module 312 correspond to a nuclear measurement tool, such as a gamma ray tool, that may include a source 316 and one or more detectors 318A, 318B. It should be appreciated that any reasonable number of detectors may be deployed and that two detectors are shown by way of example only. Moreover, one or more tools may include multiple detector configurations (e.g., ultra-near, near, far, etc.) The source 316 may be a gamma source, such as Cesium-137, as a non-limiting example, and the one or more detectors 318A, 318B may be scintillation detectors that are arranged at different distances 320A, 320B along the density module 312 from the source 316. As noted, the source 316 may also include other potential modalities for determining formation density, such as an x-ray source. If an x-ray source is used, one or more appropriate detectors may also be utilized with the density module 312. In various embodiments, the closer detector 318A may be referred to as a short-spaced (SS) detector and the further detector 318B may be referred to as a long-spaced (LS) detector. In operation, the source 316 emits gamma radiation, which may be referred to as a beam 322, isotropic outward and into the formation 308, where in various embodiments the source 316 may be collimated to direct or otherwise control an area of the formation 308 interrogated by the beam 322. The beam 322 may interact with material or particles within the formation 308, undergo scattering, and then be received at the detectors 318A, 318B. Data acquired by the detectors 318A, 318B (e.g., spectra) may be used to determine and/or correlate to density response, which may be referred to as RHO (p) with subscripts to identify different response (e.g., $RHO_{SS}$, $RHO_{LS}$, $\rho_{SS}$, $\rho_{LS}$).

The illustrated acoustic module 314 may be positioned in a vicinity of the density module 312 and include a source 324 and a detector 326, which may be integrated into a single unit, such as a transceiver. The source 324 emits a signal 328 (e.g., an acoustic signal) that is reflected by a borehole wall 330 and registered as the detector 326. Data acquired by the detector 326 may correspond to the "echo time" ($t_S$) or a time representative for the travel of the acoustic signal from the source 324 to the detector 326. Such information may be utilized to determine a distance 332 between the tool 302 and the borehole wall 330 (e.g., standoff 332). The source 324 and the detector 326 may be combined in a transceiver.

Embodiments of the present disclosure may be used to determine mud weight (RHO$_M$, $\rho_M$) and/or standoff (L) based, at least in part, on information received from the density module 312 and/or the acoustic module 314. As noted above, mud weight is of significant interest for different downhole operations. While there currently exist different approaches that either evaluate drilling fluid properties on the surface or evaluate them from acoustic or pressure measurements downhole, these systems are often insufficient for a given task, require additional expensive sensors, or may be inaccurate. For example, mud weight at a surface may not be the same in the borehole due to the different pressure and temperature of the wellbore compared to the surface location where the measurement is obtained. Systems and methods address these problems, and others, by employing gamma density measurements for evaluation of not only formation density but the mud density and standoff, as well.

Various embodiments may incorporate simultaneous (or overlapping and/or partially overlapping) using of acoustic caliper measurements and gamma density measurements. In at least one embodiment, acoustic caliper standoff measurements may be based on an independent measurement of mud density, which may be an initial estimation of mud density referred to as RHO$_{MA}$ or $\rho_{MA}$. Additionally, embodiments may also evaluate another value of mud density, which may be referred to as RHO$_M$ or $\rho_M$, from the standoff value such as using a spine-and-rib (or delta-rho) algorithm. An evaluation may determine a difference between the mud densities ($\rho_{MA}$ and $\rho_M$) whether an initial evaluation of mud density was flawed or otherwise included errors. For example, a threshold difference may be indicative of errors. Systems and methods may utilize, in at least one embodiment, an iterative refinement process where $\rho_{MA}$ is set to equal $\rho_M$, and then standoff may be evaluated again using the new value of mud density. Subsequently, the new value of standoff may then be applied to the spine-and-rib algorithm (or another algorithm) that provides a new, updated, or approximated value of the mud density $\rho_{M_{U1}}$. Over multiple iterations ($\rho_{M_{U2}}$, $\rho_{M_{U3}}$ . . . ), improvements of the standoff measurements and the mud density measurements may be realized. Advantageously, systems and methods of the present disclosure may not require information on pressure, temperature, or rheology properties of the mud. Accordingly, embodiments may be used as an alternative to conventional methods or may also be incorporated with conventional methods to refine results.

Various embodiments may provide an improved method for determining mud weight, which may be used to influence or otherwise update different operational parameters for other actions (borehole operations), such as to modify one or more drilling parameters of a drilling operation. Furthermore, systems and methods may be used with operations to maintain stability and borehole safety. In the following discussion, certain terms or algorithms may be described by way of example only, but it should be appreciated that various embodiments may lend themselves to using different algorithms that may incorporate one or more common variables used with the presently described algorithms. For example, it should be appreciated that an algorithm that uses first and second inputs may be substituted or otherwise used with another algorithm that may include the first input and/or the second input. As noted above, in the following discussion the following variables may be defined where $\rho_F$ corresponds to formation density; $\rho_{SS}$ and $\rho_{LS}$ are measured densities obtained with short-spaced and long-spaced detectors, respectively; L is standoff, $\rho_M$ is mud density (e.g., mud weight, mud specific gravity); a basic dataset corresponds to a set basic densities of $\rho_{SS\_b}$, $\rho_{LS\_b}$ obtained with Monte Carlo simulations or lab experiments, and D$_S$ is a distance-to-spine, which may be evaluated as a length of rib's arc between a measured pair ($\rho_{SS}$, $\rho_{LS}$) and the spine point ($\rho_F$, $\rho_F$) in a spine-and-ribs diagram. The spine point is the intersection of a given rib with the spine in the spine and rib diagram and corresponds to the formation density. The distance-to-spine may be the length of a straight line between the measured pair ($\rho_{SS}$, $\rho_{LS}$) and the spine point ($\rho_F$, $\rho_F$) in a spine-and-ribs diagram, or it may be the result of a curvilinear integral along the rib that represents and connects the measured pair ($\rho_{SS}$, $\rho_{LS}$) and the spine point ($\rho_F$, $\rho_F$). In an alternative embodiment the distance-to-spine may be the projection of the distance-to-spine (along the rib) onto the axis $\rho_{SS}$ or alternatively onto the axis $\rho_{LS}$.

Figure 4A:
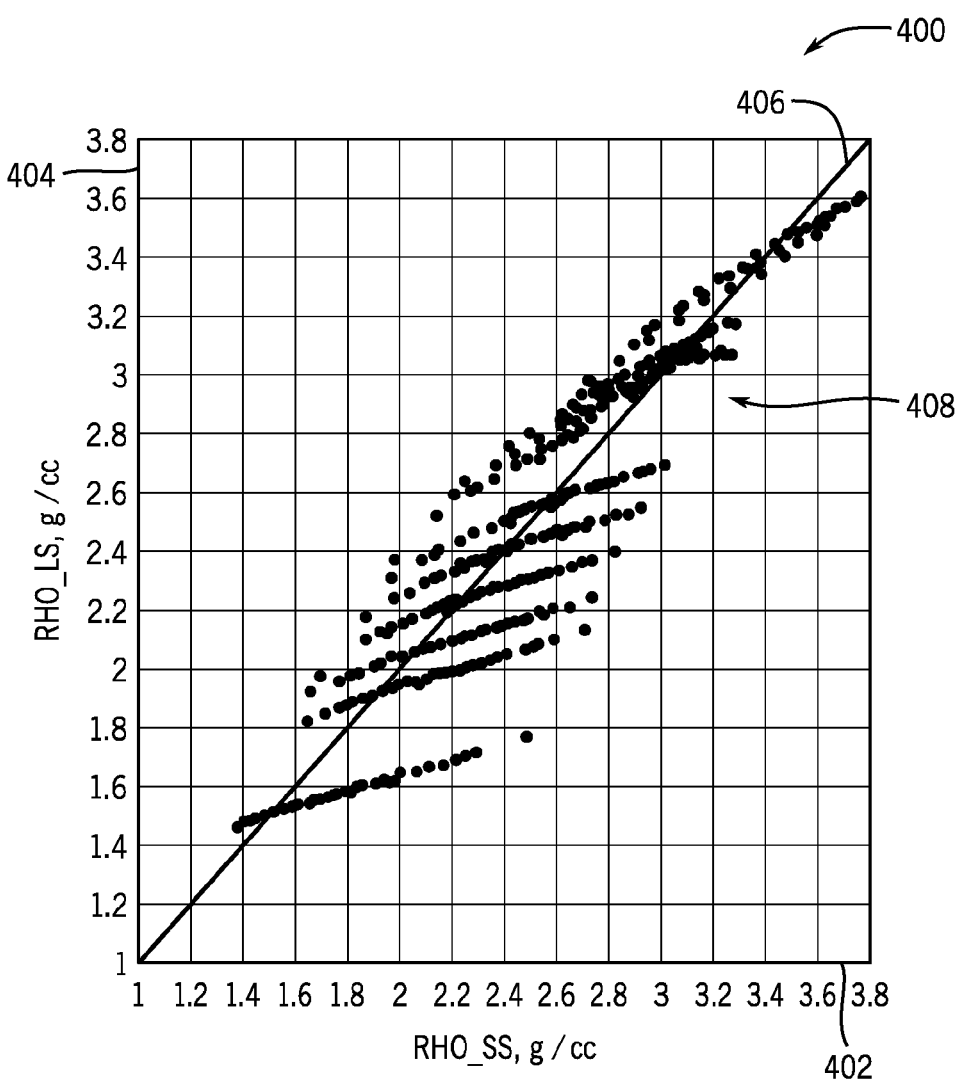
FIG. 4A is a graphical representation of an embodiment of a formation density as a spine-and-rib diagram, in accordance with embodiments of the present disclosure.

In at least one embodiment, formation density is already provided from one or more other density measurements. FIG. 4A illustrates a graphical representation of a spine-and-ribs diagram 400 that can be used for evaluation of formation density. In this example, an x-axis 402 corresponds to the density measured by the short-spaced detector $\rho_{SS}$ (g/cc) and a y-axis 404 corresponds to the density measured by the long-spaced detector $\rho_{LS}$ (g/cc). A spine 406 is shown extending through the diagram as a diagonal line arranged at a position where $\rho_{SS}$–$\rho_{LS}$. That is, along the spine 406, the standoff is equal to zero. As will be appreciated, lower standoffs may be indicative of more accurate measurements. In this example, the mud weight at this zero position (zero standoff) is 8.34 ppg. However, it should be appreciated that this is provided by way of example only. A series of points are grouped into ribs 408 (such as basic ribs), which are illustrated as extending with a positive slope across the spine 406. That is, the ribs 408 are shown as different bands or groups of points that are generally clustered along a common line or a curve that may be represented by a polynomial between the different points. In one or more embodiments, the points to form the basic ribs 408 may be obtained using one or more experiments or simulations, such as probabilistic (e.g. Monte Carlo N-Particle Transport Code (MCNP)) or deterministic radiation transport simulations. This dataset may correspond to the basic dataset, noted above. It should be appreciated that different groups of datasets along a common basic rib 408 corresponds to the same formation density. Evaluations of formation density consist of determinations to which basic rib 408 a given pair of long-spaced and short-spaced density ($\rho_{SS}$,$\rho_{LS}$) belongs. After determination of the basic rib 408, the formations density is considered evaluated, however there may be different mud densities and standoffs. In evaluation of the formation density algorithms, data points such as standoff and mud weight are not used because the data points belong to the same basic rib 408. All data points of one given basic rib relate to the same formation density ($\rho_F$), represented by the intersection of the given basic rib and the spine. That is, information that is sufficient to evaluate the formation density is insufficient, by itself, to evaluate the mud density. As a result, systems and methods further incorporate the standoff measurement.

Figure 4B:
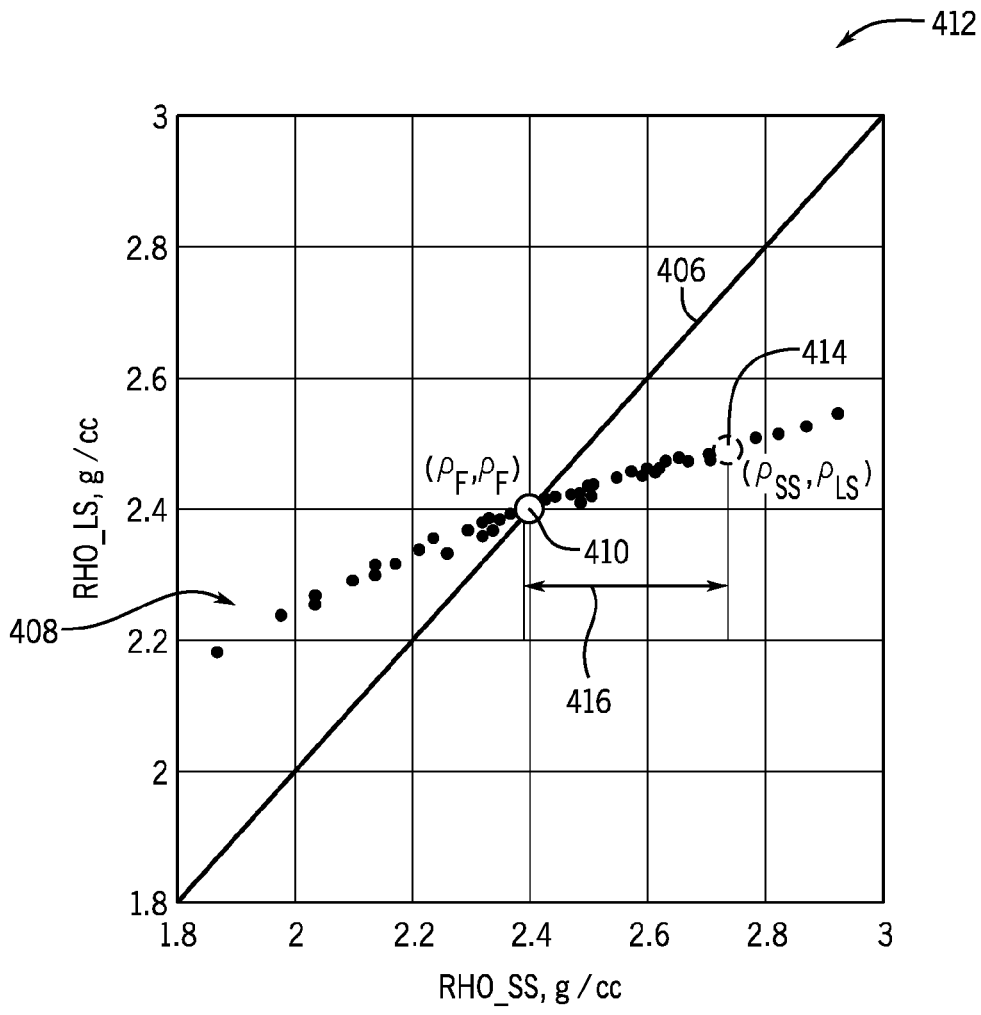
FIG. 4B is a graphical representation of an embodiment of a distance-to-spine determination along a spine-and-rib diagram, in accordance with embodiments of the present disclosure.

Various embodiments may obtain the formation density ($\rho_F$) and then further determine a basic rib 408 to which a data point in the spine and rib diagram represented by a pair of measured densities ($\rho_{SS}$, $\rho_{LS}$) belongs. In at least one embodiment, the basic rib 408 is assumed to be represented by a polynomial of the second or greater order. The identified basic rib 408 and spine 406 intersect each other at the data point represented by ($\rho_F$, $\rho_F$) (spine point) 410 in the spine and rib diagram, as shown in the graphical representation 412 of FIG. 4B, which may be a snippet or otherwise corresponds to data from the representation 400 of FIG. 4A. In this example, the data point 410 is illustrated at the location where the basic rib 408 and the spine 406 intersect. Further shown is a data point represented by the pair of measured densities ($\rho_{SS}$, $\rho_{LS}$) 414 along the basic rib 408. A distance between the data point representing the pair ($\rho_{SS}$, $\rho_{LS}$) 414 and the data point representing ($\rho_F$, $\rho_F$) 410 along the basic rib 408 is further denoted as $D_S$ 416 and referred to as distance-to-spine, as noted above. In at least one embodiment, $D_S$ is along a curvature (such as a curvilinear integral), as noted above, based on the determination of the basic rib 408. Moreover, while the illustrated embodiment includes the pair 414 on the right side of the spine 406, it should be appreciated that the pair 414 may also be on the left side, and therefore, $D_S$ may have a negative value. Accordingly, for the known formation density it is possible to substitute the pair 414 with a single parameter $D_S$. When the formation density is fixed, the mud density ($\rho_M$) can then be represented as a function of two variables, specifically distance-to-spine ($D_S$) and standoff (L). For the basic dataset, it should be appreciated that the function may be provided as distance-to-spine fitting function. For example, the distance-to-spine fitting function may be third order polynomials where each one is defined with 10 coefficients that can be stored in the tool's memory downhole in the borehole. Such a distance-to-spine fitting function is provided by way of example only and is not intended to limit or otherwise reduce the scope of the present disclosure, as different functions, different evaluation methods, and different parameters may also be utilized. Furthermore, embodiments may not process information on the tool's memory and may transmit information uphole, such as to a surface controller, to collect and analyze information. Data transmission means are well known in the prior art. The data transmission is performed from the downhole tool inside the borehole to the earth surface (surface unit) by means of mud pulse telemetry, electromagnetic telemetry, acoustic telemetry or wired pipe. The information on the spine and rib diagram, such as the rib fitting functions may be stored to a memory of the downhole tool prior to running in the borehole. Moreover, in at least one embodiment, information on the spine and rib diagram, such as the rib fitting functions, may be stored to a memory at a surface location, or at a remote location accessible from the surface location, such as via one or more network connections, and transmitted downhole to the tool after running in the borehole. The spine and rib diagram may be stored in the memory by using a spine-and-rib lookup table including coefficients of the rib fitting function representing the basic ribs in the spine rib diagram (such as coefficients of the second order polynomial). The information on the distance-to-spine ($D_S$) may be represented by a distance-to-spine fitting function and correspondingly by a distance-to-spine lookup table. The distance-to-spine lookup table may include coefficients of the distance-to-spine fitting function representing the distance-to-spine information, such as coefficients of the third order polynomial.

Various embodiments of the present disclosure may incorporate one or more workflows for evaluation of the mud density for configurations with arbitrary ($\rho_{SS}$, $\rho_{LS}$) measurements with evaluated formation density $\rho_F$ that lies between densities $\rho_{F1}$ and $\rho_{F2}$ from the basic dataset (basic ribs) for which one or more rib fitting functions are known. These densities may satisfy the condition:

$$\rho_{F1} < \rho_F < \rho_{F2}$$

In at least one embodiment, the workflow may include one or more steps, such as calculating $D_S$ and evaluating L, establishing a system of equations based on formation densities and rib fitting functions, and evaluating a final mud density. By way of example only, the $D_S$ 416 may be determined by plotting the measured data points represented by ($\rho_{SS}$, $\rho_{LS}$) along a given spine-and-rib diagram and an initial standoff value may also be determined, such as by an acoustic travel time measurement (e.g., acoustic caliper, mud cell). Thereafter, for the formation densities $\rho_{F1}$ and $\rho_{F2}$, the distance-to-spine fitting functions $FF_1$ and $FF_2$ for calculation of mud densities should be known, for example through one or more evaluations associated with the modeled data and/or basic data set. As such, mud densities for the given points may be given by:

$$\rho_{M1} = FF_1(D_S, L) \tag{1}$$

$$\rho_{M2} = FF_2(D_S, L) \tag{2}$$

where $D_S$ and L are provided as an input for one or more fitting functions (or mud density algorithms). It should be appreciated that, in various embodiments, one or more additional methods may be utilized to evaluate mud density from known parameters $D_S$ and L. At the last step of the demonstrated algorithm, mud density that corresponds to a known formation density is computed. In at least one embodiment, mud weight may be determined using Equation (3):

$$\rho_M = \frac{\rho_{M2} - \rho_{M1}}{\rho_{F2} - \rho_{F1}} \cdot (\rho_F - \rho_{F1}) + \rho_{M1} \tag{3}$$

Where the mud weight ($\rho_M$) is obtained via direct interpolation by using neighboring next basic ribs of the measured data point in the spine and rib diagram represented by the measured densities ($\rho_{SS}$, $\rho_{LS}$), wherein $\rho_F$ is assumed.

By way of example, one or more functions may be derived from historical or simulated data (e.g. MCNP), an algorithm may be used, the spine-and-rib lookup table and/or the distance-to-spine lookup table may be consulted, and the like. Accordingly, mud density may also be given by Equation (4):

$$\rho_M = MW(D_S, L) \tag{4}$$

where MW is one or more methods or functions that receives, as an input, at least $D_S$ and L. Equation (4) and corresponding Equations (1) and (2) are referred to herein as spine-and-rib algorithm. It should be appreciated that MW is provided as a generalized operator, which may also be represented as MW(L), to illustrate that there could potentially be other methods to obtain mud weight from distance-to-spine and standoff. In at least one embodiment, this operator illustrates computation via a linear interpolation between two formation densities for which rib fitting functions are available, as shown herein and in Eq. 3. Other non-limiting options may include additional algorithms, functions, or lookup tables.

In at least one embodiment, systems and methods provide an approach for allowing evaluation of mud weight from known standoff and apparent (measured) densities $\rho_{SS}$, $\rho_{LS}$ Various embodiments may further correct for inaccuracy of the standoff measurement. In an embodiment, the standoff (L) is evaluated from acoustic caliper measurements that employ some initial estimation of mud density ($\rho_{MA}$) from which the speed of sound is calculated. Furthermore, systems and methods may modify or otherwise refine calculations in accordance with the following equations, where $v_A$ is an initial estimation of speed of sound in investigated volume of mud; B is a bulk modulus of the investigated volume of mud; t is a half-time of propagation of a sound wave between source and detector in caliper measurements and depending on the speed of sound; and $L_A$ is the evaluated standoff (initial estimation of standoff). The evaluated standoff may then be obtained by Equation (5):

$$L_A = \sqrt{\frac{B}{\rho_{MA}}} \cdot t \qquad (5)$$

An accurate mud density value (e.g., a true value) provides an accurate (e.g., true) value of the standoff. It should be appreciated that accurate or true values may be considered as being within a threshold or percentage of one or more measurements obtained by one or more additional measurement or computation modalities. In Equation 5, the parameters B and t are constant at the same tool position, and as a result, the relationship between true L and initial approximate standoff $L_A$ and mud weights can be expressed by Equation (6):

$$L = L_A \cdot \sqrt{\frac{\rho_{MA}}{\rho_M}} \qquad (6)$$

Considering Equations (4) and (6) together provides an equation system with two unknown variables $\rho_M$ and L. Accordingly, the system may be solved such that the solution provides an estimation of mud density in accordance with the given assumptions provided above. The evaluation may be further checked, for example, by determining if the mud density $\rho_M$ is close to its initial evaluation $\rho_{MA}$, where a closer value is a greater indication of an accurate initial evaluation. It should be appreciated that one or more thresholds or percentages may be established to determine what is "close" to provide accuracy. By way of non-limiting example, values within 10% may be considered close. Additionally, in other embodiments, values less than 10% or less than 5% may be considered close.

As noted, one or more embodiments may include iterative models in order to solve Equations (4) and (6). For an initial guess of the mud density ($\rho_{MA}$) or initial mud density approximation, it is needed to provide some initial approximation for $L_A$. Providing this value enables solving Equation (4) and provides the first approximation for $\rho_{M_{U1}}$. Then, the first approximation of $\rho_{M_{U1}}$ can be put into Equation (6), providing the first approximation (first update) of the standoff $L_{U1}$. Then, the first approximation of standoff $L_{U1}$ can be used for calculation of the second approximation (second update) of the mud density $\rho_{M_{U2}}$ and so on ($L_{U2}$, $\rho_{M_{U3}}$, $L_{U3}$, $\rho_{M_{U4}}$ . . . ). In this manner, values may be replaced and checked until a threshold is reached, indicating an accurate calculation, wherein the threshold may be related to a difference between two subsequently determined mud density approximations or two subsequently determined standoff approximations.

Tables 1 and 2 provide results of evaluations of mud density and standoff using embodiments of the present disclosure. In these examples, a synthetic response is used to simulate a gamma density tool and imitate conditions where the standoff is estimated with some error. In this specific example, a limestone with porosity 30 p. u. and a density of 2.23 g/cc is used. Moreover, the mud density is 10 ppg. Different standoff values are considered at 0.25, 0.375, 0.5, 0.625, and 0.75 inches. For testing purposes, it is assumed that standoff values were measured with 20% underestimation. Therefore, their apparent values $L_A$ are 0.2, 0.3, 0.4, 0.5 and 0.6 inches. Several iterations are then applied in accordance with the methods described herein, where it is shown that the process may be stopped after the fifth iteration when the process converges to the solution of the equation system. The accuracy of the parameter estimation is within 5% in this simulated example. The converged values of the mud density and standoff are also referred to herein as a computed mud density and a computed standoff.

TABLE 1

Evaluation of Mud Density

| L | $L_A$ | Iteration #1 mud density $\rho_{M_{U1}}$ [ppg] | Error, % | Iteration #2 mud density $\rho_{M_{U2}}$ [ppg] | Error, % | Iteration #5 mud density $\rho_{M_{U3}}$ [ppg] | Error, % |
|---|---|---|---|---|---|---|---|
| 0.25 | 0.2 | 9.761743 | 2.38 | 10.10439 | 1.04 | 10.07938 | 0.79 |
| 0.375 | 0.3 | 8.961961 | 10.38 | 9.688008 | 3.12 | 9.594155 | 4.06 |
| 0.5 | 0.4 | 9.296647 | 7.03 | 10.11376 | 1.14 | 9.997378 | 0.03 |
| 0.625 | 0.5 | 8.917233 | 10.83 | 10.05566 | 0.56 | 9.858082 | 1.42 |
| 0.75 | 0.6 | 9.176976 | 8.23 | 10.28494 | 2.85 | 10.10479 | 1.05 |

TABLE 2

Evaluation of Standoff

| L | $L_A$ | Iteration #1 standoff $L_{U1}$ [inch] | Error, % | Iteration #2 standoff $L_{U2}$ [inch] | Error, % | Iteration #5 standoff $L_{U3}$ [inch] | Error, % |
|---|---|---|---|---|---|---|---|
| 0.25 | 0.2 | 0.253033 | 1.21 | 0.248705 | 0.52 | 0.249014 | 0.39 |
| 0.375 | 0.3 | 0.396123 | 5.63 | 0.38099 | 1.60 | 0.382849 | 2.09 |
| 0.5 | 0.4 | 0.518569 | 3.71 | 0.49718 | 0.56 | 0.500066 | 0.01 |
| 0.625 | 0.5 | 0.661858 | 5.90 | 0.623268 | 0.28 | 0.629483 | 0.72 |
| 0.75 | 0.6 | 0.782909 | 4.39 | 0.739538 | 1.39 | 0.746101 | 0.52 |

Figure 5:
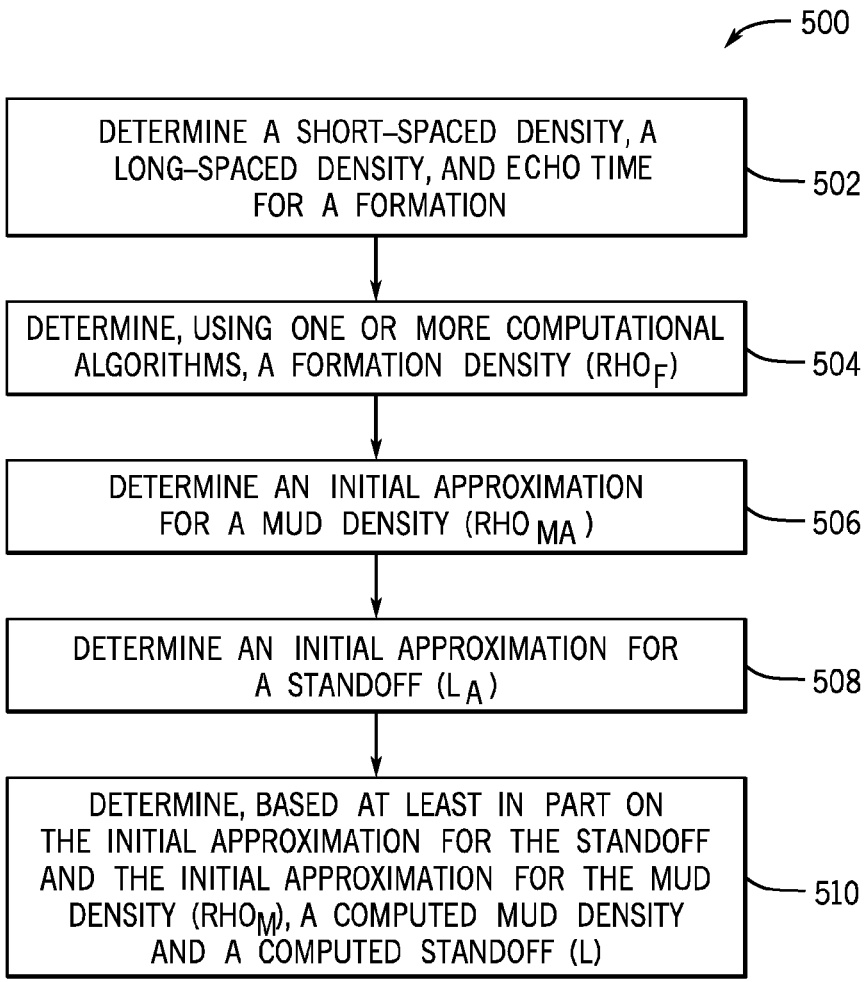
FIG. 5 is a flow chart of an embodiment of a process for determining mud weight, in accordance with embodiments of the present disclosure.

FIG. 5 is a flow chart of an embodiment of a process 500 for determining one or more of a mud density and/or a standoff. It should be appreciated that for this process, and all processes described herein, that there may be more or fewer steps. Additionally, the steps may be performed in a different order, or in parallel, unless otherwise specifically stated. In this example, one or more formation properties are obtained and/or determined 502. For example, a short-spaced density, long-spaced density, and the "echo time" may be obtained. As noted herein, the short-spaced density may correspond to data acquired using one or more nuclear measurement modalities, such as gamma ray interrogation. Additionally, the long-spaced density may also be obtained using one or more nuclear measurement modalities. The "echo time" may be acquired using one or more acoustic measurement modalities, such as an acoustic module, as described herein. These values may be obtained using instruments arranged on a downhole tool. In at least one embodiment, values are obtained during a drilling operation, which may be referred to as measurement while drilling or logging while drilling. In other embodiments, measurements may be obtained after a drilling operation, such as during a logging operation, including but not limited to wireline logging.

In at least one embodiment, formation density may be evaluated, obtained, and or determined 504. It should be appreciated that one or more algorithms may be utilized for formation density evaluations, including but not limited to a spine-and-rib diagram, a spine-and-rib lookup table, or the like. Furthermore, such evaluations may take place in real or near-real time, or may be processed at a later time after data is acquired. For example, a controller that includes a memory and a processor may be disposed on a downhole tool and/or in communication with a downhole tool that receives input data, such as the densities and time data described above, and then utilizes such information in order to obtain formation density. In an example that includes a spine-and-rib diagram, formation density may be determined, at least in part, by identifying a location along various ribs for a measured pair corresponding to the measured densities (e.g., the short-spaced and long-spaced densities). As noted, one or more embodiments may include a basic dataset that is obtained from one or more experiments or simulations, such as probabilistic (e.g. MCNP) or deterministic radiation transport simulations, that generates the basic data points of the spine and rib diagram and defines the basic ribs along a spine. By identifying a location along a basic rib, the formation density may be determined. It should be appreciated that identifying locations along a basic rib or alternatively along an interpolated rib (corresponding to the step in Eq. 3) may be performed using a database and a processor instead of using a plot or diagram on a sheet of paper (spine-and-rib plot, or spine-and-rib diagram).

Various embodiments may also determine an initial approximation or mud density 506 and an initial approximation for standoff 508. The initial approximations for mud density and standoff may be determined, at least in part, by Equation (3) using an interpolated rib between two basic ribs. For example, an initial estimation of mud density may be derived from acoustic caliper measurements, thereby permitting a determination of an initial approximation for standoff. Similarly, the initial approximation for standoff may be used in order to compute the initial approximation for mud density.

In this example, a computed mud density and computed standoff may then be determined 510. In at least one embodiment, identifying the rib for the measured pair enables a determination of a polynomial (or some other representation of the rib) to determine a distance between the measured pair and an intersection point between the spine and the rib. This distance, may be referred to as distance-to-spine value $D_S$, as noted above. Based on this distance-to-spine $D_S$, a mud density algorithm, and the initial approximation for a standoff $L_A$, a first approximated mud density $\rho_{M_{U1}}$ may be evaluated, using Equation (4) or alternatively Equation (1) (in Equation (4) $\rho_{M_{U1}}$ corresponds to $\rho_{M_{U2}}$, and L corresponds to $L_A$). Based on the first approximated mud density $\rho_{MA}$, the initial approximation for a standoff $L_A$, and the initial approximation of the mud density $\rho_{MA}$, a first approximated standoff $L_{U1}$ can be calculated using Equation (6) (in Equation (6) L corresponds to $L_{U1}$ and $\rho_M$ corresponds to $\rho_{M_{U1}}$). The first approximated standoff $L_{U1}$ is then used to determine a second approximated mud density $\rho_{M_{U2}}$ with Equation (4) (in Equation (4) $\rho_M$ corresponds to $\rho_{M_{U2}}$, and L corresponds to $L_{U1}$). Based on the second approximated mud density $\rho_{M_{U2}}$, the first approximated standoff $L_{U1}$, and the first approximated mud density $\rho_{M_{U1}}$, a second approximated standoff $L_{U2}$ can be calculated using Equation (6) (in Equation (6) $\rho_{MA}$ corresponds to $\rho_{M_{U1}}$, $\rho_M$ corresponds to $\rho_{M_{U2}}$, $L_A$ corresponds to $L_{U1}$, and L corresponds to $L_{U2}$). In a next step the second approximated standoff $L_{U2}$ is used to determine a third approximated mud density $\rho_{M_{U3}}$ with Equation (4) (in Equation (4) $\rho_M$ corresponds to $\rho_{M_{U3}}$, and L corresponds to $L_{U2}$). Based on the third approximated mud density $\rho_{M_{U3}}$, the second approximated standoff $L_{U2}$, and the second approximated mud density $\rho_{M_{U2}}$, a third approximated standoff $L_{U3}$ can be calculated using Equation (6) (in Equation (6) $\rho_{MA}$ corresponds to $\rho_{M_{U2}}$, $\rho_M$ corresponds to $\rho_{M_{U3}}$ and $L_A$ corresponds to $L_{U2}$, and L corresponds to $L_{U3}$), and so on until the difference between two subsequently approximated mud densities or two subsequently approximated standoffs is below a predetermined mud density threshold or standoff threshold, respectively, and the iteration is stopped. As noted above, embodiments are not limited to use of Equation (1) and various other algorithms and methods that may use one or more similar input values may be utilized for determinations of mud density.

FIG. 6 is a flow chart of an embodiment of a process 600 for determining a mud density. In this example, one or more formation property values are obtained 602. For example, formation property values may include formation density values, the "echo time", and the like. In at least one embodiment, the formation property values are obtained during a drilling operation, for example during an MWD operation, however, it should be appreciated that other embodiments may use previously obtained or later obtained data.

A formation density may be determined, using the formation property values, using one or more computational algorithms 604. For example, the algorithm may correspond to a technique incorporating a spine-and-rib diagram, where different ribs are arranged along a spine based, at least in part, on simulated or experimental data. Furthermore, it should be appreciated that different ribs may also be generated using previously acquired wellbore information, for example based on one or more machine learning models, among other options. Using the spine-and-rib diagram, a first location and a second location may be determined 606. In at least one embodiment, the first location corresponds to a measured pair associated with density values of the one or more formation property values. For example, the measured pair may plot a location along a rib for a short-spaced density value and a long-spaced density value. The second location may be an intersection between the rib and the spine. For example, the rib may be approximated with one or more polynomials, where the second location is the intersection between the rib and the approximated polynomial.

In at least one embodiment, a distance-to-spine is determined between the first location and the second location 608. For example, the distance-to-spine may be evaluated based, at least in part, on one or more form functions (distance-to-spine fitting function), among other options. This value may then be provided for use with determining a mud density 610, for example, as an input to an algorithm with a mud weight coefficient, as noted above. In this manner, mud density may be computed using a distance-to-spine and standoff without additional parameters typically required for such calculations.

Figure 7:
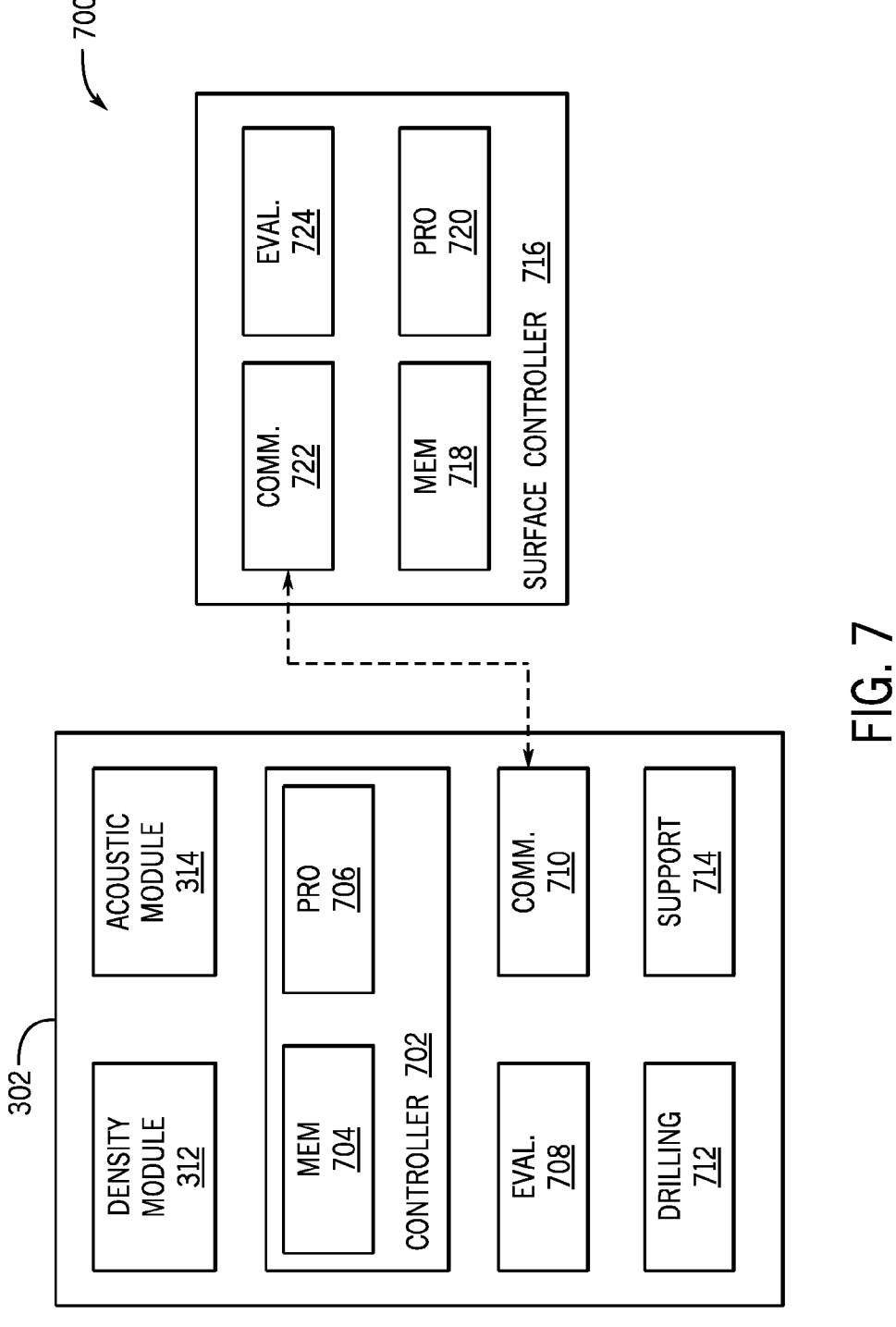
FIG. 7 is a schematic diagram of an embodiment of a control environment, in accordance with embodiments of the present disclosure.

FIG. 7 is a schematic diagram of a control environment 700 that may be utilized with embodiments of the present disclosure. In this example, the downhole tool segment 302 includes a controller 702 having a memory 704 and one or more processors 706. The memory 704 may store computer-readable instructions that, when executed by the one or more processors 706 cause one or more actions to occur with respect to the tool segment 302, such as, by way of example only, initiating data acquisition via the density module 312, initiating data acquisition via the acoustic module 314, or the like. In this example, the memory 704 may also receive and store data acquired by the modules 312, 314.

Further illustrated with respect to the tool segment 302 is an evaluation module 708, a communication system 710, a drilling controller 712, and a support controller 714. In various embodiments, the evaluation module 708 may include instructions that enable execution of one or more algorithms that may be used to determine mud weight density, among other options. For example, the evaluation module 708 may include, or have access to, one or more databases that include one or more algorithms that may be selected for use when determining mud weight density. The result of the evaluation may be transmitted to the drilling controller 712, which may then use the information to adjust one or more properties of a drilling operation. It should be appreciated that a drilling operation is provided by way of example only, and the support controller 714 may also be used to receive information from the evaluation module 708 and adjust one or more operating parameters of different support equipment, which may be based, at least in part, on the received information.

The illustrated communication system 710 may be electronic communication with a surface controller 716, which includes a surface memory 718, a surface processor 720, a surface communication system 722, and a surface evaluation module 724. In at least one embodiment, various parameters are not computed downhole on the tool, but may be transmitted to a surface location for further evaluation, with information then being transmitted back to the tool.

Embodiments may also be represented in view of the following clauses:

1. A method for determining at least one of a mud density or a standoff, comprising:
   determining, with a downhole tool in a borehole, a short-spaced density, a long-spaced density, and a time of sound propagation between a tool body of the downhole tool and a borehole wall of the borehole;
   determining, based at least in part on the short-spaced density and the long-spaced density, a formation density using a spine-and-rib-diagram;
   determining a distance-to-spine value based on the short-spaced density, the long-spaced density, and the formation density;
   determining a mud density approximation, based at least on the distance-to-spine value;
   determining a standoff approximation, based at least on the mud density approximation;
   determining, based at least on the mud density approximation and the standoff approximation, at least one of a computed mud density or a computed standoff, and
   performing a borehole operation based on at least one of the computed mud density and the computed standoff.

2. The method of clause 1, wherein the downhole tool is a density tool and the short-spaced density and the long-spaced density are based on a gamma radiation measurement.

3. The method of clause 1, wherein the formation density is determined using a rib fitting function for a rib in the spine-and-rib diagram, the short-spaced density, and the long-spaced density.

4. The method of clause 1, wherein the downhole tool is a density tool and the short-spaced density and the long-spaced density are based on a gamma radiation measurement, and wherein the formation density is determined using a rib fitting function for a rib in the spine-and-rib diagram, the short-spaced density, and the long-spaced density.

5. The method of at least one of clauses 2, 3, or 4, further comprising:
   determining the distance-to-spine value, wherein the distance-to-spine value corresponds to a distance in the spine-and-rib diagram between a spine point and a data point defined by the short-spaced density and the long-spaced density.

6. The method of claim 5, wherein determining the distance-to-spine value includes using a length of a straight line between the spine point and the data point in the spine-and-rib diagram.

7. The method of clause 4, wherein the determining the distance-to-spine value includes using the rib fitting function.

8. The method of clause 1, further comprising:
   iteratively solving a system of equations for the mud density approximation and the standoff approximation, wherein determining one of the mud density approximation or the standoff approximation is used to determine an update for the other of the mud density approximation or the standoff approximation, and using one of the updated mud density approximation or the updated standoff approximation to determine one of the computed mud density or the computed standoff.

9. The method of clause 8, further comprising:
   stopping the iterative solving when a difference between two subsequently determined mud density approximations or two subsequently determined standoff approximations is less than a threshold.

10. The method of clause 1, wherein the spine-and-rib diagram is based, at least in part, on a basic dataset generated by a simulated density tool response.

11. The method of clause 5, wherein determining the distance-to-spine value includes using a curvilinear integral.

12. The method of clause 1, wherein the borehole operation includes at least one of a drilling operation or a logging operation.

13. The method of clause 1, wherein the determinations of at least one of the computed mud density or the computed standoff are performed by a controller positioned on the downhole tool while drilling the borehole.

14. The method of clause 1, wherein determining the mud density approximation includes using a distance-to-spine fitting function, the distance-to-spine fitting function includes the distance-to-spine value and the standoff approximation.

15. The method of clause 14, wherein determining the mud density approximation includes using a lookup table, wherein the lookup table includes coefficients of the distance-to-spine fitting function.

16. A system, comprising:
   a drilling rig;
   a drill string;
   a drill bit at a distal end of the drill string;
   a density module, forming at least a portion of the drill string;

19

20 an acoustic module, forming at least a portion of the drill string; and a controller associated with the drill string, the controller including one or more memories and one or more processors, the one or more memories storing instructions that, when executed by the one or more processors, cause the controller to:

determine, based at least in part on density module data and acoustic module data, a formation density;

determine an initial estimation for a mud density;

determine an initial estimation for a standoff;

compute, based on the initial estimation for the standoff and a distance-to-spine value, a mud density approximation;

compute, based on the initial estimation for the mud density and the mud density approximation, a standoff approximation; and determine, based at least in part on the mud density approximation and the standoff approximation, a computed mud density or a computed standoff.

17. The system of clause 16, wherein the density module data includes first density module data and second density module data, and wherein the instructions that, when executed by the one or more processors, further cause the controller to:

determine the formation density using a rib fitting function in a spine-and-rib diagram based on the first density module data and the second density module data; and determine the distance-to-spine value using the determined formation density and the rib fitting function.

18. A method for determining a drilling fluid property based, at least in part, on a formation density, comprising:

receiving, from a density module, a first density measurement at a first detector position along the density module and a second density measurement from a second detector position along the density module;

receiving, from an acoustic module, a time of sound propagation between the acoustic module and a borehole wall;

determining, based at least in part on the first density measurement and the second density measurement, the formation density;

determining a distance-to-spine value using the formation density and the first density measurement and the second density measurement;

determining an initial estimation for a mud density;

determining an initial estimation for a standoff using the acoustic module;

determining a mud density approximation based on the initial estimation for the standoff and the distance-to-spine value;

determining a standoff approximation based on the mud density approximation, the initial estimation for the standoff, and the initial estimation for the mud density; and determining, based at least in part on the standoff approximation, a computed mud density.

19. The method of clause 18, wherein determining the distance-to-spine value includes using a spine-and-rib diagram, wherein the distance-to-spine value is the distance in the spine-and-rib diagram between a spine point and a data point defined by the first density measurement and the second density measurement.

20. The method of clause 19, wherein determining the distance-to-spine value includes a curvilinear integral.

21. The method of clause 19, further comprising:

providing the computed mud density to one or more downhole controllers; and performing a borehole operation based, at least in part, on the computed mud density.

The foregoing disclosure and description of the disclosed embodiments is illustrative and explanatory of various embodiments of the present disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A method for determining at least one of a mud density or a standoff, comprising:

determining, with a downhole tool in a borehole, a short-spaced density, a long-spaced density, and a time of sound propagation between a tool body of the downhole tool and a borehole wall of the borehole;

determining, based at least in part on the short-spaced density and the long-spaced density, a formation density using a spine-and-rib-diagram;

determining a distance-to-spine value based on the short-spaced density, the long-spaced density, and the formation density;

determining a mud density approximation, based at least on the distance-to-spine value and the time of sound propagation;

determining a standoff approximation, based at least on the mud density approximation;

determining, based at least on the mud density approximation and the standoff approximation, at least one of a computed mud density or a computed standoff; and performing a borehole operation based on at least one of the computed mud density or the computed standoff.

2. The method of claim 1, wherein the downhole tool is a density tool and the short-spaced density and the long-spaced density are based on a gamma radiation measurement.

3. The method of claim 1, wherein the formation density is determined using a rib fitting function for a rib in the spine-and-rib diagram, the short-spaced density, and the long-spaced density.

4. The method of claim 3, wherein the distance-to-spine value corresponds to a distance in the spine-and-rib diagram between a spine point and a data point defined by the short-spaced density and the long-spaced density.

5. The method of claim 4, wherein determining the distance-to-spine value includes using the rib fitting function.

6. The method of claim 4, wherein determining the distance-to-spine value includes using a curvilinear integral.

7. The method of claim 4, wherein determining the distance-to-spine value includes using a length of a straight line between the spine point and the data point in the spine-and-rib diagram.

8. The method of claim 1, further comprising:

iteratively solving a system of equations for the mud density approximation and the standoff approximation, wherein determining one of the mud density approximation or the standoff approximation is used to determine an update for the other of the mud density approximation or the standoff approximation, and using one of the updated mud density approximation or the updated standoff approximation to determine the at least one of the computed mud density or the computed standoff.

9. The method of claim 8, further comprising:

stopping the iterative solving when a difference between two subsequently determined updated mud density approximations or two subsequently determined updated standoff approximations is less than a threshold.

10. The method of claim 1, wherein the spine-and-rib diagram is based, at least in part, on a basic dataset generated by a simulated density tool response.

11. The method of claim 1, wherein the borehole operation includes at least one of a drilling operation or a logging operation.

12. The method of claim 1, wherein the determinations of the at least one of the computed mud density or the computed standoff are performed by a controller positioned on the downhole tool while drilling the borehole.

13. The method of claim 1, wherein determining the mud density approximation includes using a distance-to-spine fitting function, the distance-to-spine fitting function includes the distance-to-spine value and the standoff approximation.

14. The method of claim 13, wherein determining the mud density approximation includes using a lookup table, wherein the lookup table includes coefficients of the distance-to-spine fitting function.

15. A system, comprising:

a drilling rig;

a drill string;

a drill bit at a distal end of the drill string;

a density module, forming at least a portion of the drill string;

an acoustic module, forming at least a portion of the drill string; and a controller associated with the drill string, the controller including one or more memories and one or more processors, the one or more memories storing instructions that, when executed by the one or more processors, cause the controller to:

determine, based at least in part on density module data and acoustic module data, a formation density;

determine an initial estimation for a mud density;

determine an initial estimation for a standoff;

compute, based on the initial estimation for the standoff and a distance-to-spine value, a mud density approximation;

compute, based on the initial estimation for the mud density and the mud density approximation, a standoff approximation; and determine, based at least in part on the mud density approximation and the standoff approximation, a computed mud density or a computed standoff.

16. The system of claim 15, wherein the density module data includes first density module data and second density module data, and wherein the instructions that, when executed by the one or more processors, further cause the controller to:

determine the formation density using a rib fitting function in a spine-and-rib diagram based on the first density module data and the second density module data; and determine the distance-to-spine value using the determined formation density and the rib fitting function.

17. A method for determining a drilling fluid property based, at least in part, on a formation density, comprising:

receiving, from a density module, a first density measurement at a first detector position along the density module and a second density measurement from a second detector position along the density module;

receiving, from an acoustic module, a time of sound propagation between the acoustic module and a borehole wall;

determining, based at least in part on the first density measurement and the second density measurement, the formation density;

determining a distance-to-spine value using the formation density and the first density measurement and the second density measurement;

determining an initial estimation for a mud density;

determining an initial estimation for a standoff using the acoustic module;

determining a mud density approximation based on the initial estimation for the standoff and the distance-to-spine value;

determining a standoff approximation based on the mud density approximation, the initial estimation for the standoff, and the initial estimation for the mud density; and determining, based at least in part on the standoff approximation, a computed mud density.

18. The method of claim 17, wherein determining the distance-to-spine value includes using a spine-and-rib diagram, wherein the distance-to-spine value is the distance in the spine-and-rib diagram between a spine point and a data point defined by the first density measurement and the second density measurement.

19. The method of claim 18, wherein determining the distance-to-spine value includes a curvilinear integral.

20. The method of claim 18, further comprising:

providing the computed mud density to one or more downhole controllers; and performing a borehole operation based, at least in part, on the computed mud density.

* * * * *